(12) United States Patent
Kuo et al.

(10) Patent No.: US 9,067,393 B2
(45) Date of Patent: Jun. 30, 2015

(54) METHOD OF TRANSFERRING CARBON CONDUCTIVE FILM

(71) Applicant: INDUSTRIAL TECHNOLOGY RESEARCH INSTITUTE, Hsinchu (TW)

(72) Inventors: Shin-Liang Kuo, Hsinchu (TW); Cheng-Jyun Huang, Pingzhen (TW); Shu-Jiuan Huang, Taipei (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 345 days.

(21) Appl. No.: 13/796,048

(22) Filed: Mar. 12, 2013

(65) Prior Publication Data

US 2014/0116609 A1  May 1, 2014

(30) Foreign Application Priority Data

Oct. 29, 2012  (TW) .............................. 101139868 A (51) Int. Cl.
  B29C 65/48 (2006.01)
  B32B 37/12 (2006.01)
  (Continued)

(52) U.S. Cl.
  CPC ................. B32B 37/02 (2013.01); B32B 38/10 (2013.01); *B32B 38/164* (2013.01); *B32B 2037/243* (2013.01); *B32B 2307/202* (2013.01); *B32B 2313/04* (2013.01)

(58) Field of Classification Search
  CPC ........ B32B 7/06; B32B 37/02; B32B 37/025; B32B 37/18; B32B 2037/243; B32B 38/10; B32B 38/164; B32B 2307/202; B32B 2313/04; B44C 1/175; B44C 1/1754; C23C 26/00; B29L 2009/00; B29L 2009/003; B29L 2009/005
  USPC ................. 156/230, 236, 242, 246, 247, 249; 428/343
  See application file for complete search history.

(56) References Cited

U.S. PATENT DOCUMENTS 5,807,506 A * 9/1998 Cunningham et al. ........ 252/511
5,958,196 A * 9/1999 Lubin et al. ................... 204/242

(Continued)

FOREIGN PATENT DOCUMENTS

CN   100534900 C   9/2009
TW   200302503    8/2003

(Continued)

OTHER PUBLICATIONS

Gu et al., "Fabrication of Free-standing, Conductive, and Transparent Carbon Nanotube Films", Advanced Materials, vol. 20, 2008, pp. 4433-4437.

(Continued)

*Primary Examiner* — Sing P Chan
(74) *Attorney, Agent, or Firm* — Birch, Stewart, Kolasch & Birch, LLP (57) ABSTRACT

Disclosed is a method of transferring a carbon conductive film, including: providing a first substrate, and forming an inorganic oxide layer on a surface of the first substrate, wherein the inorganic oxide layer has a total surface energy of 30 mJ/m$^2$ to 75 mJ/m$^2$, and a dispersive surface energy to the total surface energy ratio of 0.4 to 0.8. A carbon dispersion is coated on the inorganic oxide layer, and then dried to form a carbon conductive film on the inorganic oxide layer. The carbon conductive film is dipped into a solvent to separate the carbon conductive film and the inorganic oxide layer. The separated carbon conductive film is attached to a second substrate, thereby transferring the carbon conductive film onto the second substrate.

15 Claims, 4 Drawing Sheets

(51) Int. Cl.
| | |
|---|---|
| *B32B 37/26* | (2006.01) |
| *B32B 38/10* | (2006.01) |
| *B32B 38/16* | (2006.01) |
| *B32B 37/02* | (2006.01) |
| *B32B 38/00* | (2006.01) |
| *B32B 37/24* | (2006.01) |

(56) References Cited

U.S. PATENT DOCUMENTS

| | | | | |
|---|---|---|---|---|
| 5,958,302 | A * | 9/1999 | Cunningham et al. | 252/500 |
| 6,294,257 | B1 * | 9/2001 | Tsukakoshi et al. | 428/400 |
| 6,753,112 | B2 * | 6/2004 | Ooya et al. | 429/232 |
| 7,049,007 | B2 * | 5/2006 | Gales et al. | 428/607 |
| 7,288,336 | B2 | 10/2007 | Fukuda et al. | |
| 7,943,491 | B2 | 5/2011 | Nuzzo et al. | |
| 7,976,935 | B2 * | 7/2011 | Wu et al. | 428/195.1 |
| 8,057,863 | B2 | 11/2011 | Liang | |
| 8,377,523 | B2 * | 2/2013 | Wu | 428/32.69 |
| 8,778,116 | B2 * | 7/2014 | Morimoto et al. | 156/241 |
| 2002/0094064 | A1 | 7/2002 | Zhou et al. | |
| 2002/0127473 | A1 * | 9/2002 | Ooya et al. | 429/232 |
| 2004/0209106 | A1 * | 10/2004 | Gales et al. | 428/607 |
| 2005/0228097 | A1 | 10/2005 | Zhong | |
| 2005/0266162 | A1 * | 12/2005 | Luo et al. | 427/180 |
| 2005/0269559 | A1 | 12/2005 | Zhou et al. | |
| 2005/0286293 | A1 | 12/2005 | Furukawa et al. | |
| 2006/0001109 | A1 | 1/2006 | Shaheen et al. | |
| 2006/0165896 | A1 | 7/2006 | Afzali-Ardakani et al. | |
| 2006/0188721 | A1 | 8/2006 | Irvin, Jr. et al. | |
| 2006/0269466 | A1 | 11/2006 | Huang et al. | |
| 2006/0280912 | A1 | 12/2006 | Liang et al. | |
| 2006/0286785 | A1 | 12/2006 | Rogers et al. | |
| 2007/0115554 | A1 | 5/2007 | Breitung et al. | |
| 2007/0120273 | A1 | 5/2007 | Eckstein et al. | |
| 2008/0157235 | A1 | 7/2008 | Rogers et al. | |
| 2008/0280202 | A1 * | 11/2008 | Yen et al. | 429/210 |
| 2009/0258495 | A1 | 10/2009 | Chan et al. | |
| 2010/0006442 | A1 * | 1/2010 | Lochtman et al. | 205/50 |
| 2010/0127242 | A1 | 5/2010 | Zhou et al. | |
| 2010/0252184 | A1 * | 10/2010 | Morimoto et al. | 156/241 |
| 2010/0317132 | A1 | 12/2010 | Rogers et al. | |
| 2010/0330305 | A1 * | 12/2010 | Wu | 428/32.5 |
| 2011/0030772 | A1 | 2/2011 | Veerasamy | |
| 2011/0052841 | A1 * | 3/2011 | Wu et al. | 428/32.5 |
| 2011/0070146 | A1 * | 3/2011 | Song et al. | 423/448 |
| 2011/0104467 | A1 * | 5/2011 | Wu et al. | 428/220 |
| 2011/0111202 | A1 | 5/2011 | Su et al. | |
| 2011/0148248 | A1 | 6/2011 | Landa | |
| 2011/0163296 | A1 | 7/2011 | Pace et al. | |
| 2011/0182805 | A1 * | 7/2011 | DeSimone et al. | 424/1.11 |
| 2011/0204319 | A1 | 8/2011 | Virkar et al. | |
| 2011/0240951 | A1 | 10/2011 | Yang et al. | |
| 2011/0244203 | A1 * | 10/2011 | Wu et al. | 428/215 |
| 2011/0280076 | A1 | 11/2011 | Samachisa et al. | |
| 2012/0034385 | A1 | 2/2012 | Chen et al. | |
| 2012/0034391 | A1 | 2/2012 | Chang et al. | |
| 2012/0039344 | A1 | 2/2012 | Kian et al. | |
| 2012/0104381 | A1 | 5/2012 | Shieh et al. | |
| 2012/0153772 | A1 | 6/2012 | Landa et al. | |
| 2012/0177934 | A1 | 7/2012 | Vogel et al. | |
| 2012/0312467 | A1 | 12/2012 | Kleine Jaeger et al. | |
| 2013/0084443 | A1 * | 4/2013 | Wu et al. | 428/215 |

FOREIGN PATENT DOCUMENTS

| | | |
|---|---|---|
| TW | I252562 | 4/2006 |
| TW | 200618279 | 6/2006 |
| TW | 200635992 | 10/2006 |
| TW | 200626747 | 8/2007 |
| TW | I287263 | 9/2007 |
| TW | 200742752 | 11/2007 |
| TW | 200823485 | 6/2008 |
| TW | 200836352 | 9/2008 |
| TW | I306834 | 3/2009 |
| TW | 200916949 A | 4/2009 |
| TW | 201003733 A1 | 1/2010 |
| TW | 201017941 A1 | 5/2010 |
| TW | I326297 | 6/2010 |
| TW | 201024208 A1 | 7/2010 |
| TW | 201036240 A1 | 7/2010 |
| TW | I333656 | 11/2010 |
| TW | 201042951 A1 | 12/2010 |
| TW | 201104948 A1 | 2/2011 |
| TW | 201116480 A1 | 5/2011 |
| TW | 201117233 A1 | 5/2011 |
| TW | 201120109 A1 | 6/2011 |
| TW | 201126795 A1 | 8/2011 |
| TW | I346411 | 8/2011 |
| TW | 201133906 A1 | 10/2011 |
| TW | 201136828 A1 | 11/2011 |
| TW | 201206825 A1 | 2/2012 |
| TW | I358092 B1 | 2/2012 |
| TW | 201210113 A1 | 3/2012 |
| TW | 201214738 A1 | 4/2012 |
| TW | I384032 | 2/2013 |
| WO | WO 2006/115547 A2 | 11/2006 |

OTHER PUBLICATIONS

Liu et al., "Free-Standing Highly Conductive Transparent Ultrathin Single-Walled Carbon Nanotube Films", J. Am. Chem. Soc., vol. 132, No. 46, 2010 (Published online Oct. 28, 2010), pp. 16581-16586.

Meitl et al., "Solution Casting and Transfer Printing Single-Walled Carbon Nanotube Films", Nano Letters, vol. 4, No. 9, 2004 (Published online Jul. 29, 2004), pp. 1643-1647.

Shi et al., "Fabrication of Superstrong Ultrathin Free-Standing Single-Walled Carbon Nanotube Films via a Wet Process", Adv. Funct. Mater., vol. 21, 2011 (Published online Sep. 8, 2011), pp. 4358-4363.

Shin et al., "Smooth, transparent, conducting and flexible SWCNT films by filtration-wet transfer processes", Journal of Physics D: Applied Physics, vol. 42, 045305, Jan. 30, 2009, pp. 1-4.

Wang et al., "Optimizing Single-Walled Carbon Nanotubes Films for Applications in Electroluminescent Devices", Advanced Materials, vol. 20, 2008, pp. 4442-4449.

Wu et al., "Transparent, Conductive Carbon Nanotube Films", Science, vol. 305, Aug. 27, 2004, pp. 1273-1276.

Zhou et al., "A method of printing carbon nanotube thin films", Applied Physics Letters, vol. 88, 2006 (Published online Mar. 22, 2006), pp. 123109-1 to 123109-3.

* cited by examiner

METHOD OF TRANSFERRING CARBON CONDUCTIVE FILM

CROSS REFERENCE TO RELATED APPLICATIONS

The present application is based on, and claims priority from, Taiwan Application Serial Number 101139868, filed on Oct. 29, 2012, the disclosure of which is hereby incorporated by reference herein in its entirety.

TECHNICAL FIELD

The technical field relates to a carbon conductive film, and in particular to a method for transferring it from one substrate to another substrate.

BACKGROUND

Flat displays, touch panels, photovoltaics, and next-generation flexible electronics are developed over time, such that a market of transparent conductive films (e.g. ITO) is correspondingly grown. However, the ITO would be partially replaced by other materials due to its high cost, limited sources, and low flexibility. Carbon nanotube (CNT) has properties such as high aspect ratio, high electrical conductivity, excellent mechanical strength, and chemical resistance, thereby having the potential for application in transparent conductive film. Compared to the ITO, transparent conductive film composed of CNT has advantages such as better flexibility, climate resistance, being easier to manufacture, and a natural color.

Carbon nanotube conductive film is generally formed by spray coating, slot-die coating, micro-gravure coating, dip coating, spin coating, vacuum filtration, or layer-by-layer assembly. However, only slot-die coating, micro-gravure coating, and spray coating are capable of mass production. The mainstream of preparing the carbon nanotube dispersion is aqueous solution system. The carbon nanotube of a relatively high concentration is dispersed in water by a dispersant, and dispersants such as sodium dodecylbenzene sulfonate (SDBS) or sodium dodecyl sulfate (SDS) have a higher dispersibility. If an organic solvent such as N-methyl-2-pyrrolidone (NMP), chloroform, dichloromethane, or the likes is selected to directly disperse the carbon nanotube, the concentration of carbon nanotube in the dispersion is too low to form the carbon nanotube conductive film by the slot-die coating or the micro-gravure coating. In addition, the organic solvent may chemically etch some polymer substrate, and the organic solvent will encounter environmental safety problems.

While coating the carbon nanotube as a film, matching the properties of dispersion liquid and the substrate is critical. The surface tension of the carbon nanotube dispersion is limited to the solvent and dispersant systems. Therefore, it is only with difficulty that the carbon nanotube conductive film is formed on a substrate having a relatively low surface energy such as polymethylmethacrylate (PMMA), polypropylene (PP), polyethylene (PE), polydimethylsiloxane (PDMS), polytetrafluoroethene (PTFE), and the like, by coating. In addition, until now it has only been possible to form a conductive film of a carbon nano material on a non-planar substrate by spray coating, and the conductive film still encounters low coating uniformity and a low utility of material.

In comparison of proposed transfer processes of CNT conductive films, transfer technique based on vacuum filtration processes encounters limitations on mass production and preparation of large-area CNT films. Properties of transferred CNT conductive films prepared by dissolving filters and adhesion layer are possibly degraded due to incomplete removal of polymeric materials. In addition, when multiple-step transfer processes are carried out with PDMS stamps, completeness and uniformity of transferred CNT film is hard to control precisely. Accordingly, a novel method of forming a carbon conductive film onto various substrates is called-for.

SUMMARY

One embodiment of the disclosure provides a method for transferring a carbon conductive film, comprising: providing a first substrate; forming an inorganic oxide layer on a surface of the first substrate, wherein the inorganic oxide layer has a total surface energy of 30 mJ/m$^2$ to 75 mJ/m$^2$, and a dispersive surface energy to the total surface energy ratio of 0.4 to 0.8; coating a carbon dispersion on the inorganic oxide layer; drying the carbon dispersion to form a carbon conductive film on the inorganic oxide layer; dipping the carbon conductive film into a solvent to separate the carbon conductive film and the inorganic oxide layer; and attaching the separated carbon conductive film to a second substrate, thereby transferring the carbon conductive film onto the second substrate.

A detailed description is given in the following embodiments with reference to the accompanying drawings.

BRIEF DESCRIPTION OF THE DRAWINGS

The disclosure can be more fully understood by reading the subsequent detailed description and examples with references made to the accompanying drawings, wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Figure 1:
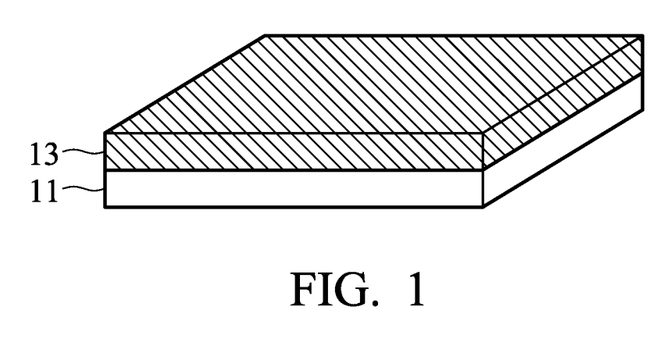
FIGS. 1 to 4 show a process of transferring a carbon conductive film from a first substrate to a second substrate.

As shown in FIG. 1, an inorganic oxide layer 13 was formed on the surface of a first substrate 11. The first substrate 11 is not limited to a specific material. Any material which is compatible with the inorganic oxide layer 13 thereon and tolerates the subsequent processes will be suitable for the first substrate 11. In one embodiment, the inorganic oxide layer 13 is formed by a wet process. For example, a dispersion of inorganic oxide particles is coated on the first substrate 11 and then dried, wherein the inorganic oxide particles are sol in solvent phase. The surface energy of the inorganic oxide layer is determined by types and amounts of surface functionalities, surface roughness and structure of the inorganic oxide layer. The polarity of inorganic oxide sols is easily tuned by surface modification using grafting of organic compounds and hydrolysis/condensation reactions of silane-based agents. Functional groups with higher polarities result in relative higher total surface energy and a lower dispersive surface energy to total surface energy ratio for the oxide layers. Functional groups with lower polarity contribute to relative lower total surface energy and a higher dispersive surface energy to total surface energy ratio. Surface modification technique of oxides is well known. The typical modification agents include amino-silane, epoxide-silane, acrylate-silane, alkyl-silane, benzyl-silane, fluoro-silane with different molecule structures. In this embodiment, the particle size of inorganic oxides is from 2 nm to 200 nm. In another embodiment, the particle size of inorganic oxides is from 4 nm to 60 nm. Because inorganic oxide particles having an overly large size will increase the surface roughness of the inorganic oxide layer, it is difficult that the carbon nano material is coated to form a film with a uniform thickness, and carbon nano material could partially jammed during the transfer process. Inorganic oxide particles having an overly small size, typically by a dry process, will form a smoother surface, such that the interaction of carbon nano materials and inorganic oxide layer increases due to increase of contact area, and the solvent is more difficult to penetrate into the gap for separation of the carbon conductive film. In another embodiment, the inorganic oxide layer 13 is formed by a dry process such as evaporation deposition, sputtering deposition, chemical vapor deposition, or physical vapor deposition. The inorganic oxide layer 13 can be composed of silicon oxide (silica), zirconium oxide (zirconia), aluminum oxide (alumina), tin oxide, titanium oxide (titania), zinc oxide, or combinations thereof. Whatever process is selected, the inorganic oxide layer 13 has a total surface energy of 30 mJ/m$^2$ to 75 mJ/m$^2$, and a dispersive surface energy to total surface energy ratio of 0.4 to 0.8. In another embodiment, a total surface energy is from 35 mJ/m$^2$ to 65 mJ/m$^2$, and a dispersive surface energy to total surface energy ratio is form 0.45 to 0.75. The definition of the total surface energy and the dispersive surface energy can be found in Journal of Achievements in Materials and Manufacturing Engineering, 24, 137-145 (2007), and solid surface energy can be calculated by Owens-Wendt geometric average method. If the inorganic oxide layer 13 has an overly low total surface energy, the carbon conductive film cannot be formed thereon. If the inorganic oxide layer 13 has an overly low dispersive surface energy to total surface energy ratio (also an overly low dispersive surface energy), the carbon conductive film formed on the inorganic oxide layer 13 cannot be separated from the inorganic oxide layer by dipping it into a solvent. If the inorganic oxide layer 13 has an overly high dispersive surface energy to total surface energy ratio (also an overly high dispersive surface energy), the carbon conductive film formed on the inorganic oxide layer 13 cannot be separated from the inorganic oxide layer by dipping it into a solvent. In one embodiment, the thickness of inorganic oxide layers is from 30 nm to 500 nm due to considerations of coating and flexibility of the entire film.

Figure 2:
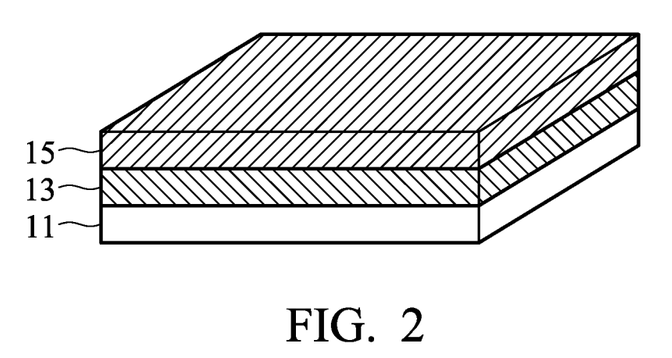

As shown in FIG. 2, the carbon dispersion is coated on the inorganic oxide layer 13, and then dried to form a carbon conductive film 15 on the inorganic oxide layer 13. The carbon dispersion may include a carbon material with sp$^2$ graphitic structure domain, such as carbon nanotube, graphene, graphene oxide, chemically reduced graphene oxide, graphene nanoribbon, or combinations thereof. In one embodiment, the carbon dispersion has a carbon material concentration of 0.001 wt % to 2.0 wt %. In another embodiment, the carbon dispersion has a carbon material concentration of 0.01 wt % to 0.5 wt %. If a carbon dispersion has an overly high carbon material concentration, it will be difficult to form a well-dispersed carbon dispersion. If a carbon dispersion has an overly low carbon material concentration, the carbon conductive film with a proper thickness or electrical conductivity will be formed with multiple coatings or one thick, wet coating. However, it is difficult to obtain a carbon conductive film having uniform thickness from drying the thick, wet film due to irregular drying phenomena. The carbon dispersion can be coated on the inorganic oxide layer 13 by wire bar coating, spray coating, slot-die coating, microgravure coating, dip coating, spin coating, or other common coating methods. In one embodiment, the carbon dispersion is dried at a temperature of 30° C. to 180° C. for a period of 10 seconds to 2 hours. In another embodiment, the carbon dispersion is dried at a temperature of 60° C. to 140° C. for a period of 30 seconds to 1 hour. If a carbon dispersion is dried at an overly low temperature and/or for an overly short period, the carbon dispersion cannot be dried to form the compact carbon conductive film 15, and the carbon conductive film will be broken into several pieces as dipping into a solvent. If a carbon dispersion is dried at an overly high temperature and/or for an overly long period, the carbon conductive film 15 and the inorganic oxide layer 13 will have an overly large interaction therebetween, such that the carbon conductive film 15 formed on the inorganic oxide layer 13 cannot be separated from the inorganic oxide layer 13 by dipping it into a solvent.

Figure 3:
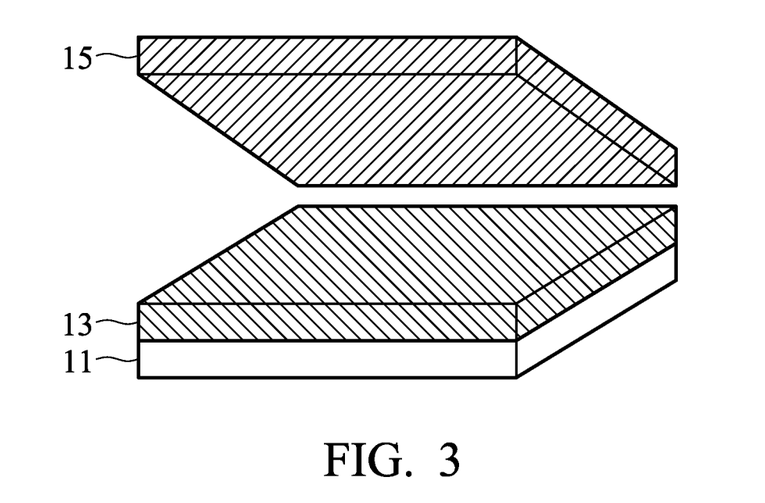

As shown in FIG. 3, a multi-layered structure of the first substrate 11, the inorganic oxide layer 13, and the carbon conductive film 15 are dipped into a solvent to separate the carbon conductive film 15 and the inorganic oxide layer 13. The carbon conductive film 15 is then floated on the interface of air and solvent. The solvent does not participate in dissolution or reactions the inorganic oxide layer. In one embodiment, the solvent can be water, ethylene glycol, dimethyl sulfoxide, propylene carbonate, N,N-dimethylformamide, ethanol, isopropanol, 1-propanol, or other solvents and mixtures with higher surface tension. In another embodiment, the solvent is water due to its high surface tension. Surfactants can be added to improve the penetration capability of solvent into the carbon conductive film and the inorganic oxide layer.

Figure 4:
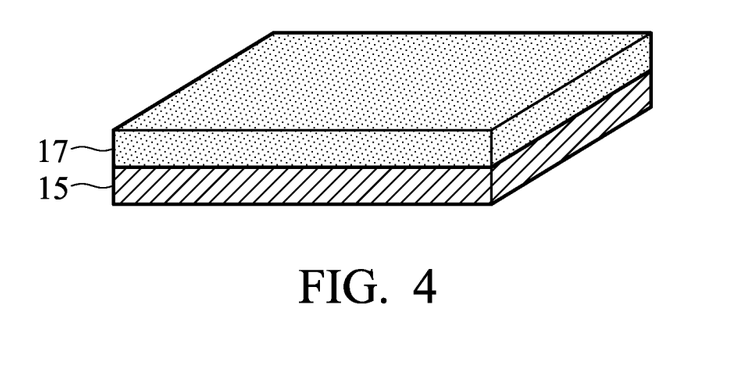

As shown in FIG. 4, the second substrate 17 is then disposed on the carbon conductive film 15 to attach the second substrate 17 and the carbon conductive film 15, thereby completing the transfer of the carbon conductive film 15. The attachment of the second substrate 17 can be from either side of the carbon conductive film 15. In one embodiment, the attachment of the second substrate 17 is preceded from the top side. A compact attachment of carbon conductive film 15 can be achieved due to no interference of solvent in between. In one embodiment, the second substrate 17 can be glass, metal, plastics, synthetic resin such as polyethyleneterephthalate, polycarbonate, polypropylene, polyethylene, polydimethylsiloxane, polytetrafluoroethylene, polyvinylidene difluoride, polyimide, poly(ethylene 2,6-naphthalate), or polyethersulfone. In one embodiment, the second substrate 17 can be a non-planar substrate such as a curved substrate. Note that the carbon nanotube conductive film 15 formed on the non-planar second substrate 17 has a uniform thickness.

Figure 5:
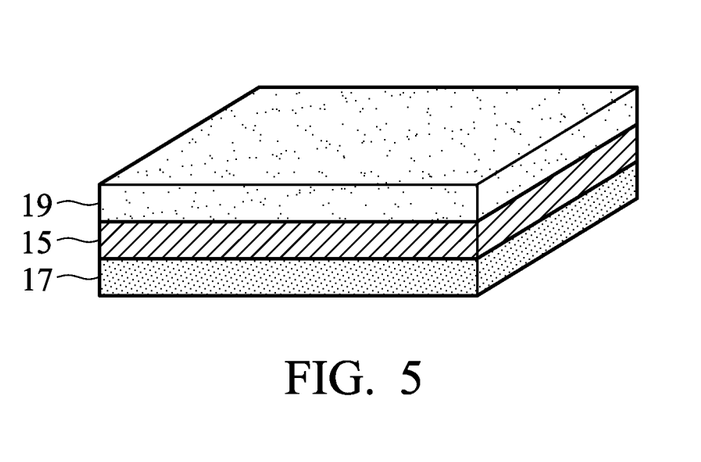
FIGS. 5 to 7 show a process of transferring a carbon conductive film from the second substrate to a third substrate.

In another embodiment, an adhesive layer 19 is further applied on a surface of the carbon conductive film 15. As shown in FIG. 5, the carbon conductive film 15 is disposed between the second substrate 17 and the adhesive layer 19. Although the adhesive layer 19 in FIG. 5 is formed on the entire surface of the carbon conductive film 15, the adhesive layer 19 can be formed on a partial surface (e.g. dispensing) of the carbon conductive film 15 if necessary. The adhesive layer 19 can be a photo curable glue such as LOCA-2175 or EAS-1616 commercially available from 3M or UV-SIL 400 commercially available from Dow Corning, a thermal curable glue like aqueous glue, such as RZ-570 commercially available from HANK COMPANY LTD., Taiwan, moisture curable glue such as silicone-9176L commercially available from Dow Corning, a pressure sensitive glue such as OCA-8142 or OCA-8262 commercially available from 3M, or the likes.

Figure 6:
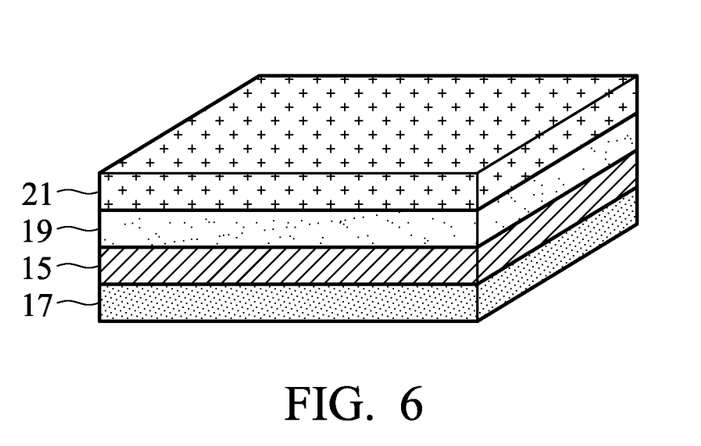
Figure 7:
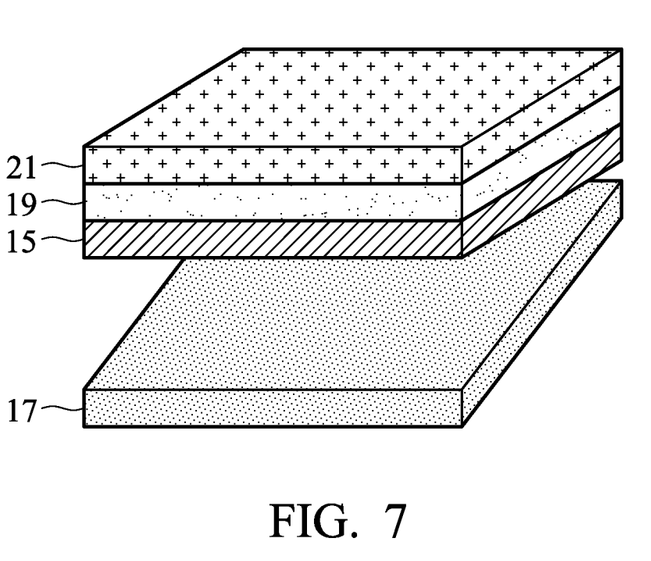

As shown in FIG. 6, a third substrate 21 is attached to the adhesive layer 19 by thermal pressing, vacuum laminating, or the likes. The adhesive layer 19 is then cured by thermal curing, photo curing, moisture curing, or pressure curing, and the curing type is determined by the adhesive layer 19 type. The second substrate 17 is removed at last, thereby transferring the carbon conductive film 15 onto the third substrate 21. Similar to the second substrate 17, the third substrate 21 can be a non-planar substrate such as a curved substrate. Note that the carbon nanotube conductive film 15 formed on the non-planar third substrate 21 has a uniform thickness.

The transferring process can be further applied to a continuous process such as a roll-to-roll process or the likes to meet the requirement of mass production. It should be understood that the inorganic oxide layer 13 formed on the first substrate 11 can be used repeatedly. Compared to a conventional process that forms a carbon conductive film on a substrate and then etches out the substrate to obtain the carbon conductive film, the easier method of the disclosure costs less time.

Below, exemplary embodiments will be described in detail with reference to accompanying drawings so as to be easily realized by a person having ordinary knowledge in the art. The inventive concept may be embodied in various forms without being limited to the exemplary embodiments set forth herein. Descriptions of well-known parts are omitted for clarity, and like reference numerals refer to like elements throughout.

Surface energy of the substrate can be calculated by the contact angle of the substrate between the pure water/diiodomethane and the substrate surface through the Owens-Wendt geometric average method as shown in Formula 1.

$$\gamma_{LV}(1+\cos\theta)=2\sqrt{\gamma_S^D\gamma_L^D}+2\sqrt{\gamma_S^P\gamma_L^P} \quad \text{(Formula 1)}$$

The surface energy ($\gamma$) of the substrate is composed of a polar surface energy ($\gamma^P$) and a dispersive surface energy ($\gamma^D$). The pure water had a dispersive surface energy of 21.8 ml/m$^2$ and a polar surface energy of 51.0 mJ/m$^2$, respectively. The diiodomethane had a dispersive surface energy of 48.5 mJ/m$^2$ and a polar surface energy of 2.3 mJ/m$^2$, respectively.

Sheet resistance of the conductive carbon films was measured by a four point resistance meter (LORESTA-GP, commercially available from Mitsubishi Chemical Co.).

EXAMPLES

The carbon nanotube in examples of the disclosure was a purified single-walled carbon nanotube (SWNT), which was prepared by floated catalytic chemical vapor deposition in TW patent No. I306834. 0.1 parts by weight of the purified SWNT, 0.2 parts by weight of sodium dedocylbenzene, and 100.0 parts by weight of de-ionized water were mixed, and then oscillated by a supersonic oscillator (Sonicator 3000, commercially available from Misonix) to obtain an SWNT dispersion.

Example 1

1.0 g of silica sol in solvent phase (IPA-ST, solid content of 30 wt % to 31 wt %, particle size of 10 nm to 15 nm, solvent being isopropyl alcohol, and commercially available from Nissan Chemical) was added to 14.0 g of ethanol to obtain a silica dispersion with a solid content of about 2.0 wt %. A PET film (A4300, commercially available from Toyobo) with a thickness of 188 μm was selected as a first substrate. The silica dispersion was coated on the first substrate by a wire bar (RDS coating rod#4) and a coater (ZA2300, commercially available from ZEHNTNER), and then dried at 100° C. in a circulator oven to form a silica layer on the first substrate. The thickness of the silica layer was about 150 nm. The contact angles of the water/diiodomethane and the silica layer were measured, and the surface energy of the silica layer was calculated, as tabulated in Table 1.

TABLE 1

| | Contact angle (°) | | | | Surface energy (mJ/m$^2$) | | | Dispersive surface energy to total surface energy ratio $\gamma_S^D/\gamma_S$ |
|---|---|---|---|---|---|---|---|---|
| | Water | | Diiodomethane | | Dispersive surface energy $\gamma_S^D$ | Polar surface energy $\gamma_S^P$ | Total surface energy $\gamma_S$ | |
| | Average value | Standard deviation | Average value | Standard deviation | | | | |
| Example 1 | 66.80 | 0.46 | 53.03 | 0.81 | 25.06 | 14.68 | 39.74 | 0.63 |
| Example 2 | 46.00 | 6.72 | 32.73 | 0.96 | 31.77 | 24.53 | 56.30 | 0.56 |
| Example 3 | 54.97 | 0.47 | 45.60 | 3.44 | 26.95 | 21.43 | 48.38 | 0.56 |
| Example 4 | 43.50 | 0.56 | 35.37 | 0.91 | 30.51 | 16.67 | 47.18 | 0.65 |
| Example 5 | 45.87 | 1.53 | 44.10 | 0.85 | 26.12 | 28.14 | 54.26 | 0.48 |
| Example 6 | 39.20 | 0.36 | 30.03 | 2.56 | 31.78 | 28.74 | 60.52 | 0.53 |
| Comparative Example 1 | 76.97 | 0.76 | 40.27 | 0.21 | 34.95 | 5.67 | 40.62 | 0.86 |
| Comparative Example 2 | 15.30 | 2.07 | 37.43 | 0.35 | 25.88 | 44.72 | 70.60 | 0.37 |
| Comparative Example 3 | 59.37 | 4.12 | 40.70 | 1.31 | 50.72 | 10.62 | 61.34 | 0.83 |

0.5 g of the SWNT dispersion was coated onto the silica layer overlying the PET film by a wire bar (RDS coating rod#3), and then dried in a circulator oven to form a carbon nanotube conductive film. The drying factors such as temperature and period were tabulated in Table 2. The sheet resistances of the carbon nanotube conductive films before the separation process (original sheet resistance) were also tabulated in Table 2.

TABLE 2

| Test number in Example 1 | Inorganic oxide layer precursor | Drying temperature (° C.) | Drying period (minute) | Separation appearance | Original sheet resistance ($\Omega/\square$) | Sheet resistance after separation ($\Omega/\square$) |
|---|---|---|---|---|---|---|
| Test 1 | IPA-ST | 60 | 1 | Complete separation | 430 | $>3 \times 10^7$ |
| Test 2 | IPA-ST | 60 | 5 | Complete separation | 430 | $>3 \times 10^7$ |
| Test 3 | IPA-ST | 60 | 10 | Complete separation | 430 | $>3 \times 10^7$ |
| Test 4 | IPA-ST | 60 | 60 | Complete separation | 430 | $>3 \times 10^7$ |
| Test 5 | IPA-ST | 80 | 1 | Complete separation | 435 | $>3 \times 10^7$ |
| Test 6 | IPA-ST | 80 | 5 | Complete separation | 435 | $>3 \times 10^7$ |
| Test 7 | IPA-ST | 80 | 10 | Complete separation | 435 | $>3 \times 10^7$ |
| Test 8 | IPA-ST | 80 | 60 | Complete separation | 435 | $>3 \times 10^7$ |
| Test 9 | IPA-ST | 100 | 1 | Complete separation | 430 | $>3 \times 10^7$ |
| Test 10 | IPA-ST | 100 | 5 | Complete separation | 430 | $>3 \times 10^7$ |
| Test 11 | IPA-ST | 100 | 10 | Complete separation | 430 | $>3 \times 10^7$ |
| Test 12 | IPA-ST | 100 | 30 | Complete separation | 430 | $>3 \times 10^7$ |
| Test 13 | IPA-ST | 100 | 60 | Complete separation | 430 | $>3 \times 10^7$ |
| Test 14 | IPA-ST | 120 | 1 | Complete separation | 420 | $>3 \times 10^7$ |
| Test 15 | IPA-ST | 120 | 5 | Complete separation | 420 | $>3 \times 10^7$ |
| Test 16 | IPA-ST | 120 | 10 | Complete separation | 420 | $>3 \times 10^7$ |
| Test 17 | IPA-ST | 140 | 1 | Complete separation | 415 | $>3 \times 10^7$ |
| Test 18 | IPA-ST | 140 | 5 | Complete separation | 415 | $>3 \times 10^7$ |
| Test 19 | IPA-ST | 140 | 10 | Complete separation | 415 | $>3 \times 10^7$ |
| Test 20 | IPA-ST | 140 | 30 | Complete separation | 415 | $>3 \times 10^7$ |
| Test 21 | IPA-ST | 160 | 10 | No separation | 430 | 430 |
| Test 22 | IPA-ST | 200 | 1 | No separation | 430 | 430 |

A vessel with a sectional area larger than the carbon nanotube conductive film was filled with de-ionized water. The substrate having a surface coated with the carbon nanotube conductive film was slowly dipped into the de-ionized water in the vessel. The carbon nanotube conductive films dried by the temperature of 60° C. to 140° C. were completely separated from the silica layer overlying the substrate to float on the de-ionized water due to the surface tension of the water, as shown in Table 2. As proven in experiments, the carbon nanotube conductive films dried by an overly high temperature (e.g. 160° C. to 200° C.) could not be separated from the silica layer.

Finally, another PET film (A4300, commercially available from Toyobo) with a thickness of 188 μm was selected as a second substrate. The carbon nanotube conductive film floated on the de-ionized water was attached to the second substrate, thereby completing a transfer of the carbon nanotube film. For ensuring the carbon nanotube conductive film was completely separated from the silica layer or not, the sheet resistance of the first substrate with the silica layer thereon dipped in the vessel (sheet resistance after separation) was measured. As shown in Table 2, the carbon nanotube conductive films dried by the temperature of 60° C. to 140° C. were completely separated from the silica layer overlying the substrate, such that the first substrates after separation had a high sheet resistance. On the other hand, the carbon nanotube conductive films dried by an overly high temperature (e.g. higher than 140° C.) or an overly low temperature (e.g. lower than 60° C.) could not be separated from the silica layer, such that the first substrates after separation still had the carbon nanotube conductive film thereon with a low sheet resistance.

Example 2

Example 2 was similar to Example 1, and the difference in Example 2 was the silica sol in solvent phase being replaced by another silica sol in solvent phase (IPA-ST-L, solid content of 30 wt % to 31 wt %, particle size of 40 nm to 60 nm, solvent being isopropyl alcohol, and commercially available from Nissan Chemical). In Example 2, the substrate type and the processes for coating the silica sol and the SWNT dispersion by the wire bond were similar to that of Example 1. The contact angles of the water/diiodomethane and the silica layer were measured, and the surface energy of the silica layer was calculated, as tabulated in Table 1. The sheet resistances of the carbon nanotube conductive film before the separation process (original sheet resistance) was 430Ω/□, as tabulated in Table 3. The substrate having a surface coated with the carbon nanotube conductive film was slowly dipped into the de-ionized water in the vessel, and the separation appearance thereof was tabulated in Table 3. The sheet resistance of the first substrate with the silica layer thereon dipped in the vessel (sheet resistance after separation) was also measured and tabulated in Table 3.

Example 3

Example 3 was similar to Example 1, and the difference in Example 3 was the silica sol in solvent phase being replaced by another silica sol in solvent phase (MEK-ST, solid content of 30 wt % to 31 wt %, particle size of 10 nm to 15 nm, solvent being methyl ethyl ketone, and commercially available from Nissan Chemical). In Example 3, the substrate type and the processes for coating the silica sol and the SWNT dispersion by the wire bond were similar to that of Example 1. The contact angles of the water/diiodomethane and the silica layer were measured, and the surface energy of the silica layer was calculated, as tabulated in Table 1. The sheet resistances of the carbon nanotube conductive film before the separation process (original sheet resistance) was 420Ω/□, as tabulated in Table 3. The substrate having a surface coated with the carbon nanotube conductive film was slowly dipped into the de-ionized water in the vessel, and the separation appearance thereof was tabulated in Table 3. The sheet resistance of the first substrate with the silica layer thereon dipped in the vessel (sheet resistance after separation) was also measured and tabulated in Table 3.

Example 4

Example 4 was similar to Example 1, and the difference in Example 4 was the silica sol in solvent phase being replaced by another silica sol in solvent phase (MEK-AC-2101, solid content of 30 wt % to 31 wt %, particle size of 10 nm to 15 nm, solvent being methyl ethyl ketone, and commercially available from Nissan Chemical). In Example 4, the substrate type and the processes for coating the silica sol and the SWNT dispersion by the wire bond were similar to that of Example 1. The contact angles of the water/diiodomethane and the silica layer were measured, and the surface energy of the silica layer was calculated, as tabulated in Table 1. The sheet resistances of the carbon nanotube conductive film before the separation process (original sheet resistance) was 425Ω/□, as tabulated in Table 3. The substrate having a surface coated with the carbon nanotube conductive film was slowly dipped into the de-ionized water in the vessel, and the separation appearance thereof was tabulated in Table 3. The sheet resistance of the first substrate with the silica layer thereon dipped in the vessel (sheet resistance after separation) was also measured and tabulated in Table 3.

Example 5

Example 5 was similar to Example 1, and the difference in Example 5 was the silica sol in solvent phase being replaced by a zirconia sol in solvent phase (OZ-S30K, solid content of 30 wt %, particle size of 10 nm, solvent being methyl ethyl ketone, and commercially available from Nissan Chemical). In Example 5, the substrate type and the processes for coating the zirconia sol and the SWNT dispersion by the wire bond were similar to that of Example 1. The contact angles of the water/diiodomethane and the zirconia layer were measured, and the surface energy of the zirconia layer was calculated, as tabulated in Table 1. The sheet resistances of the carbon nanotube conductive film before the separation process (original sheet resistance) was 430Ω/□, as tabulated in Table 3. The substrate having a surface coated with the carbon nanotube conductive film was slowly dipped into the de-ionized water in the vessel, and the separation appearance thereof was tabulated in Table 3. The sheet resistance of the first substrate with the zirconia layer thereon dipped in the vessel (sheet resistance after separation) was also measured and tabulated in Table 3.

Example 6

Example 6 was similar to Example 1, and the difference in Example 6 was the silica sol in solvent phase being replaced by a zirconia sol in aqueous phase (30B, solid content of 30 wt %, particle size of 10 nm to 20 nm, solvent being water, and commercially available from Nissan Chemical). In Example 6, the substrate type and the processes for coating the zirconia sol and the SWNT dispersion by the wire bond were similar to that of Example 1. The contact angles of the water/diiodomethane and the zirconia layer were measured, and the surface energy of the zirconia layer was calculated, as tabulated in Table 1. The sheet resistances of the carbon nanotube conductive film before the separation process (original sheet resistance) was 550Ω/□, as tabulated in Table 3. The substrate having a surface coated with the carbon nanotube conductive film was slowly dipped into the de-ionized water in the vessel, and the separation appearance thereof was tabulated in Table 3. The sheet resistance of the first substrate with the zirconia layer thereon dipped in the vessel (sheet resistance after separation) was also measured and tabulated in Table 3.

Comparative Example 1

Comparative Example 1 was similar to Example 1, and the difference in Comparative Example 1 was the SWNT dispersion being directly coated on the PET film and then dried at different temperatures. In other words, the process of coating the silica sol in solvent phase by the wire bond was omitted in Comparative Example 1. In Comparative Example 1, the substrate type and the process for coating the SWNT dispersion by the wire bond were similar to that of Example 1. The contact angles of the water/diiodomethane and the PET film were measured, and the surface energy of the PET film was calculated, as tabulated in Table 1. The sheet resistances of the carbon nanotube conductive film before the separation process (original sheet resistance) was 1100Ω/□, as tabulated in Table 3. The substrate having a surface coated with the carbon nanotube conductive film was slowly dipped into the de-ionized water in the vessel, and no separation occurred, as shown in Table 3. The sheet resistance of the first substrate dipped in the vessel (sheet resistance after separation) was also measured and tabulated in Table 3. As seen in Comparative Example 1, the carbon nanotube conductive film directly formed on the first substrate could not be separated from the first substrate by dipping it into a solvent. As such, the carbon nanotube conductive film fixed on the first substrate could not be transferred to another substrate.

Comparative Example 2

Comparative Example 2 was similar to Example 1, and the difference in Comparative Example 2 was the silica sol in solvent phase being replaced by a silica sol in aqueous phase (ST-N, solid content of 20 wt %, particle size of 10 nm to 15 nm, solvent being water, and commercially available from Nissan Chemical). In Comparative Example 2, the substrate type and the processes for coating the silica sol and the SWNT dispersion by the wire bond were similar to that of Example 1. The contact angles of the water/diiodomethane and the silica layer were measured, and the surface energy of the silica layer was calculated, as tabulated in Table 1. The sheet resistances of the carbon nanotube conductive film before the separation process (original sheet resistance) was 430Ω/□, as tabulated in Table 3. The substrate having a surface coated with the carbon nanotube conductive film was slowly dipped into the de-ionized water in the vessel, and no separation occurred, as shown in Table 3. The sheet resistance of the first substrate dipped in the vessel (sheet resistance after separation) was also measured and tabulated in Table 3. As seen in Comparative Example 2, if the inorganic oxide layer had an overly low dispersive surface energy to total surface energy ratio (0.37), the carbon nanotube conductive film formed on the inorganic oxide layer could not be separated from the inorganic oxide layer by dipping it into a solvent. As such, the carbon nanotube conductive film fixed on the first substrate could not be transferred to another substrate.

diiodomethane and the silica layer were measured, and the surface energy of the silica layer was calculated, as tabulated in Table 1. The sheet resistances of the carbon nanotube conductive film before the separation process (original sheet resistance) was 650Ω/□, as tabulated in Table 3. The substrate having a surface coated with the carbon nanotube conductive film was slowly dipped into the de-ionized water in the vessel, and no separation occurred, as shown in Table 3. The sheet resistance of the first substrate dipped in the vessel (sheet resistance after separation) was also measured and tabulated in Table 3. As seen in Comparative Example 3, if the inorganic oxide layer had an overly high dispersive surface energy to total surface energy ratio (0.83), the carbon nanotube conductive film formed on the inorganic oxide layer could not be separated from the inorganic oxide layer by dipping it into a solvent. As such, the carbon nanotube conductive film fixed on the first substrate could not be transferred to another substrate.

TABLE 3

|  | Inorganic oxide layer precursor | Drying temperature (° C.) | Drying period (minute) | Separation appearance | Original sheet resistance (Ω/□) | Sheet resistance after separation (Ω/□) |
|---|---|---|---|---|---|---|
| Example 2, Test 23 | IPA-ST-L | 100 | 1 | Complete separation | 430 | >3 × 10$^7$ |
| Example 3, Test 24 | MEK-ST | 100 | 1 | Complete separation | 420 | >3 × 10$^7$ |
| Example 4, Test 25 | MEK-AC-2101 | 100 | 1 | Complete separation | 425 | >3 × 10$^7$ |
| Example 5, Test 26 | OZ-S30K | 100 | 1 | Complete separation | 430 | >3 × 10$^7$ |
| Example 6, Test 27 | 30B | 100 | 1 | Complete separation | 550 | >3 × 10$^7$ |
| Comparative Example 1, Test 28 | None | 80 | 1 | No separation | 1100 | 1100 |
| Comparative Example 1, Test 29 | None | 100 | 1 | No separation | 1100 | 1100 |
| Comparative Example 1, Test 30 | None | 140 | 1 | No separation | 1100 | 1100 |
| Comparative Example 2, Test 31 | ST-N | 80 | 1 | No separation | 430 | 430 |
| Comparative Example 2, Test 32 | ST-N | 100 | 1 | No separation | 430 | 430 |
| Comparative Example 2, Test 33 | ST-N | 140 | 1 | No separation | 430 | 430 |
| Comparative Example 3, Test 34 | DMAc-ST | 100 | 1 | No separation | 650 | 650 |

Comparative Example 3

Comparative Example 2 was similar to Example 1, and the difference in Comparative Example 2 was the silica sol in solvent phase being replaced by another silica sol in solvent phase (DMAc-ST, solid content of 30 wt %, particle size of 10 nm to 15 nm, solvent being dimethylacetamide, and commercially available from Nissan Chemical). In Comparative Example 3, the substrate type and the processes for coating the silica sol and the SWNT dispersion by the wire bond were similar to that of Example 1. The contact angles of the water/

Example 7

Example 7 was similar to Example 1, and the difference in Example 7 was the replacement of the PET film with a polycarbonate plate as the second substrate. However, the carbon nanotube conductive film separated from the first substrate was still able to attach onto the second substrate, thereby completing the transfer of the carbon nanotube conductive film.

Example 8

Example 8 was similar to Example 1, and the difference in Example 8 was the replacement of the PET film with a polyethylene film in the second substrate. However, the carbon nanotube conductive film separated from the first substrate was still able to attach onto the second substrate, thereby completing the transfer of the carbon nanotube conductive film.

Example 9

Example 9 was similar to Example 1, and the difference in Example 9 was the replacement of the PET film with a polymethylmethacrylate plate as the second substrate. However, the carbon nanotube conductive film separated from the first substrate was still able to attach onto the second substrate, thereby completing the transfer of the carbon nanotube conductive film.

Example 10

Example 10 was similar to Example 1, and the difference in Example 10 was the replacement of the PET film with a round glass bottle as the second substrate. However, the carbon nanotube conductive film separated from the first substrate was still able to attach onto the second substrate, thereby completing the transfer of the carbon nanotube conductive film.

Example 11

Example 11 was similar to Example 1, and the difference in Example 11 was the replacement of the PET film with a fluorosilicone release film (FFR-1602, commercially available from Chisin Enterprise Ltd. CO., Taiwan) as the second substrate. However, the carbon nanotube conductive film separated from the first substrate was still able to attach onto the second substrate, thereby completing the first transfer of the carbon nanotube conductive film from the first substrate to the second substrate. A UV glue (LOCA-2175, commercially available from 3M) was then coated on a surface of the carbon nanotube conductive film attached on the second substrate, and then dried at 80° C. to remove solvent in the UV glue. A third substrate (polycarbonate plate) was attached to the UV glue, and then exposed by a UV exposure machine to cure the UV glue. The second substrate (the fluorosilicone release film) was then torn off to complete the second transfer of the carbon nanotube conductive film from the second substrate to the third substrate.

Example 12

Example 12 was similar to Example 11, and the difference in Example 12 was the replacement of the UV glue with an aqueous glue (RE-570, commercially available from HANK COMPANY LTD., Taiwan) as the adhesive layer. After the aqueous glue was coated on a surface of the carbon nanotube conductive film attached to the second substrate, a third substrate (polycarbonate plate) was attached to the aqueous glue, and the aqueous glue was then dried at 100° C. to be cured. The second substrate (the fluorosilicone release film) was then torn off to complete the second transfer of the carbon nanotube conductive film from the second substrate to the third substrate.

It will be apparent to those skilled in the art that various modifications and variations can be made to the disclosed methods and materials. It is intended that the specification and examples be considered as exemplary only, with the true scope of the disclosure being indicated by the following claims and their equivalents.

What is claimed is:

1. A method for transferring a carbon conductive film, comprising:
   providing a first substrate;
   forming an inorganic oxide layer on a surface of the first substrate, wherein the inorganic oxide layer has a total surface energy of 30 mJ/m$^2$ to 75 mJ/m$^2$, and a dispersive surface energy to the total surface energy ratio of 0.4 to 0.8;
   coating a carbon dispersion on the inorganic oxide layer;
   drying the carbon dispersion to form a carbon conductive film on the inorganic oxide layer;
   dipping the carbon conductive film into a solvent to separate the carbon conductive film and the inorganic oxide layer; and
   attaching the separated carbon conductive film to a second substrate, thereby transferring the carbon conductive film onto the second substrate.

2. The method as claimed in claim 1, wherein the step of forming the inorganic oxide layer on the surface of the first substrate comprises:
   coating a dispersion of inorganic oxide particles on the surface of the first substrate, wherein the inorganic oxide particles are sol in solvent phase; and
   drying the dispersion of the inorganic oxide particles to form the inorganic oxide layer.

3. The method as claimed in claim 2, wherein the inorganic oxide particles have a size of 2 nm to 200 nm.

4. The method as claimed in claim 1, wherein the step of forming the inorganic oxide layer on the surface of the first substrate comprises evaporation deposition, sputtering deposition, chemical vapor deposition, or physical vapor deposition.

5. The method as claimed in claim 1, wherein the inorganic oxide layer comprises silicon oxide, zirconium oxide, aluminum oxide, tin oxide, titanium oxide, zinc oxide, or combinations thereof.

6. The method as claimed in claim 1, wherein the carbon dispersion comprises carbon nanotube, graphene, graphene oxide, chemically reduced graphene oxide, graphene nanoribbon, or combinations thereof.

7. The method as claimed in claim 1, wherein the carbon dispersion has a carbon material concentration of 0.001 wt % to 2.0 wt %.

8. The method as claimed in claim 1, wherein the step of drying the carbon dispersion is performed at a temperature of 60° C. to 140° C. for a period of 30 seconds to 1 hour.

9. The method as claimed in claim 1, wherein the solvent comprises water, ethylene glycol, dimethyl sulfoxide, N,N-dimethylformamide, propylene carbonate, ethanol, isopropanol, 1-propanol, or combinations thereof.

10. The method as claimed in claim 1, wherein the second substrate comprises glass, plastics, synthetic resin, or metal.

11. The method as claimed in claim 10, wherein the synthetic resin comprises polyethyleneterephthalate, polycarbonate, polypropylene, polyethylene, polydimethylsiloxane, polytetrafluoroethylene, polyvinylidene difluoride, polyimide, poly(ethylene 2,6-naphthalate), or polyethersulfone.

12. The method as claimed in claim 1, wherein the second substrate comprises a non-planar substrate.

13. The method as claimed in claim 1, further comprising:
   applying an adhesive layer on a surface of the carbon conductive film, wherein the carbon conductive film is disposed between the adhesive layer and the second substrate;

attaching a third substrate to the adhesive layer and then curing the adhesive layer, thereby transferring the carbon conductive film onto the third substrate; and removing the second substrate.

14. The method as claimed in claim 13, wherein the step of curing the adhesive layer comprises thermal curing, photo curing, moisture curing, or pressure curing.

15. The method as claimed in claim 13, wherein the third substrate comprises a non-planar substrate.

* * * * *